(12) United States Patent
Chiodo et al.

(10) Patent No.: US 7,424,531 B2
(45) Date of Patent: Sep. 9, 2008

(54) CONSOLE PERSONALIZATION

(75) Inventors: Christopher Chiodo, Newton, MA (US); Michael Jasnowski, Amherst, NH (US)

(73) Assignee: BEA Systems, Inc., San Jose, CA (US)

( * ) Notice: Subject to any disclaimer, the term of this patent is extended or adjusted under 35 U.S.C. 154(b) by 157 days.

(21) Appl. No.: 11/111,624

(22) Filed: Apr. 21, 2005

(65) Prior Publication Data

US 2005/0251550 A1 Nov. 10, 2005

Related U.S. Application Data

(60) Provisional application No. 60/568,719, filed on May 6, 2004.

(51) Int. Cl.
*G06F 15/173* (2006.01)
(52) U.S. Cl. ............... 709/225; 709/217; 726/4; 726/21
(58) Field of Classification Search .............. 718/104; 715/810, 500; 719/320; 713/193, 201; 710/1; 709/217, 225, 224; 707/9; 705/1; 726/4, 726/21
See application file for complete search history.

(56) References Cited

U.S. PATENT DOCUMENTS

| | | | | |
|---|---|---|---|---|
| 5,729,734 A | * | 3/1998 | Parker et al. | 707/9 |
| 6,189,032 B1 | * | 2/2001 | Susaki et al. | 709/225 |
| 6,678,889 B1 | * | 1/2004 | Burkett et al. | 718/104 |
| 7,251,785 B1 | * | 7/2007 | Howard | 705/1 |
| 2004/0078495 A1 | * | 4/2004 | Mousseau et al. | 710/1 |
| 2005/0102536 A1 | * | 5/2005 | Patrick et al. | 713/201 |
| 2005/0188295 A1 | * | 8/2005 | Konkus et al. | 715/500 |
| 2005/0198196 A1 | * | 9/2005 | Bohn et al. | 709/217 |
| 2005/0216860 A1 | * | 9/2005 | Petrov et al. | 715/810 |
| 2005/0262362 A1 | * | 11/2005 | Patrick et al. | 713/193 |
| 2006/0031849 A1 | * | 2/2006 | Barta et al. | 719/320 |

* cited by examiner

*Primary Examiner*—Jungwon Chang
(74) *Attorney, Agent, or Firm*—Fliesler Meyer LLP

(57) ABSTRACT

Personalization of an administration console for different administration groups can be done using a resource inheritance hierarchy. In one embodiment, JSP derived hierarchy levels can be used in the checking of the privileges granted for reading or writing resources in the administration console.

20 Claims, 4 Drawing Sheets

CONSOLE PERSONALIZATION

CLAIM OF PRIORITY

This application claims priority to U.S. Provisional Application No. 60/568,719 entitled "Console Personalization" by Chiodo et al., filed May 6, 2004.

BACKGROUND OF INVENTION

The present invention relates to system administration consoles used to manage application server resources.

DETAILED DESCRIPTION

Figure 1:
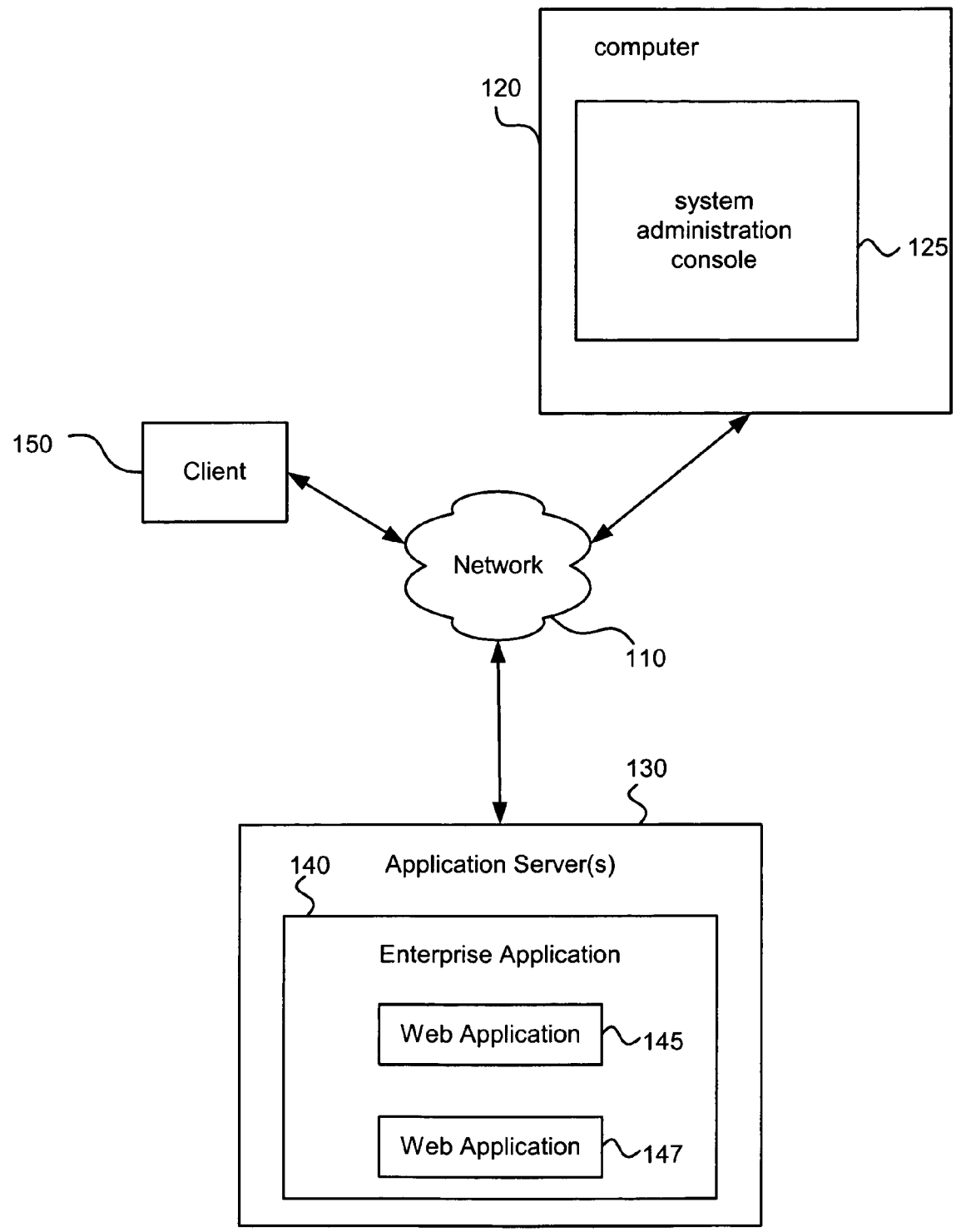
FIG. 1 is a diagram that illustrates a system including application servers and a system administration console.

FIG. 1 illustrates a system of one embodiment of the present invention including a system administration console 125. In this example, the system administration console is an assistant administration tool that can allow the installation, configuration, monitoring and management of application server resources. In the example of FIG. 1, application server or servers 130 run an enterprise application 140. The application server(s) can be software such as a WebLogic Server™ installation or installations. WebLogic Server™ is available from BEA Systems of San Jose, Calif. In one embodiment, the system administration system console 125 can be used to manage and monitor applications hosted on the enterprise application 140, such as web applications 145 and 147. The enterprise application 140 can consist of one or multiple enterprise application insistences hosted on one or more physical machines.

In one embodiment, a domain is a logically related group of application resources that are managed as a unit by an administration server and the system administration console. The domain can include one or more application server instances or clusters. A client 150 can access the web applications administered by the system administration console across the network 110.

In one embodiment, the system administration uses the JAVA Management Extension (JMX) specification. The JMX API models system and administration functions with JAVA objects called MBeans. MBeans used to manage an enterprise application 140 can include administration, configuration, and runtime MBeans. Administration MBeans contain a set of attributes that define configuration parameters for management functions. In one embodiment, a config.xml file is located at a machine hosting an administration server, which provides persistent storage of MBeans attribute values. Whenever an attribute is changed using the system administrator console 125, the values can be stored in the appropriate administration MBean and written to the config.xml file. Configuration MBeans are copies of the administration MBeans that the other servers use to initialize their configuration. Runtime MBeans are attributes consisting of runtime information for active application servers and instances in applications.

In one embodiment, the system administration console 125 is hosted by an administration server. In one embodiment, the administration console can be accessed using a web browser from a machine from a local network, which can communicate with the administration server. In one embodiment, the system administration console can have management capability over application server instances, clusters and applications. The management capability can include configuration, stopping and starting application servers, monitoring server health and performance, monitoring application performance, viewing server logs, editing deployment descriptions for web applications, Enterprise JAVA Beans (EJBs), J2EE connectors, and enterprise applications. The system administration console 125 in one embodiment allows users to do management tasks without interfacing with JMX APIs or the underlying management architecture.

In one embodiment, security for the system administration console is done based upon a number of user roles. User roles can include an administrator role which can have exhaustive control over the administration servers through the administration console; an operator role which can start, stop administration servers in clusters; a deployment role which can operate upon the applications; and the monitor role, which can read out the information about the operation of the servers and applications.

Figure 2:
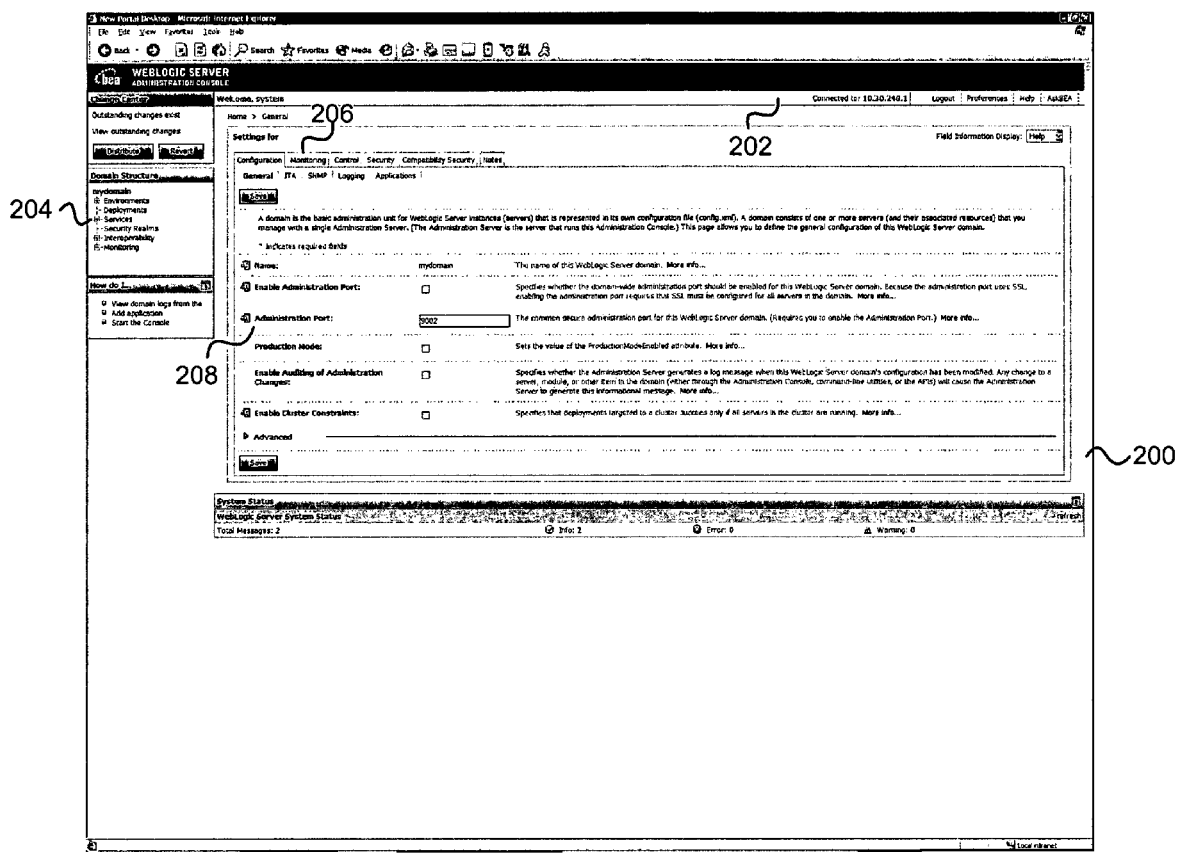
FIG. 2 is a diagram that illustrates a display of a system administration console in one embodiment of the present invention.

FIG. 2 illustrates a diagram of a system administration console 200. In one example, the banner area 202 shows the name and configurations of the monitored object currently displayed in the console, shows the host name or IP address of the administration server, shows the user name used to log in to the console, shows links to the logout of the console, shows an icon to display the console home page, shows an icon to get help on the console operations, and shows an icon to display the contents of the right panel of the console. The left panel in the administration console shows a navigation tree used to navigate the console pages. After left-clicking the nodes 204, console pages related to the nodes will be displayed in the right panel of the console. Nodes proceeded by a plus sign can be expanded to access additional resources. In the example shown here, there is a tabbed interfaced in the right panel with tabs 206. The tabs 206 allow access to additional displays. This example shows attributes 208 which include a field which can be used to change the administration port.

Figure 3:
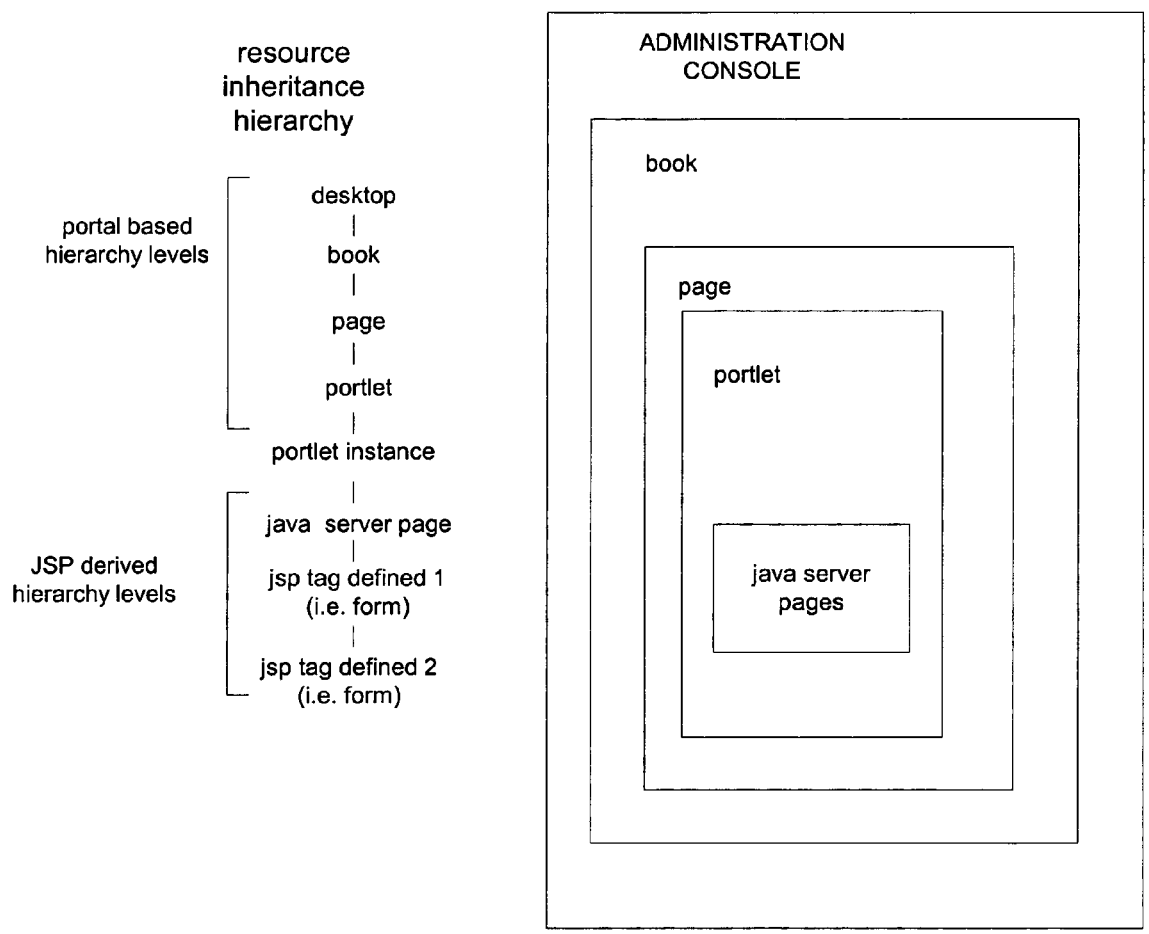
FIG. 3 is a diagram that illustrates a resource inheritance hierarchy used with the system administration console of one embodiment of the present invention.

FIG. 3 illustrates an administration console with a resource inheritance hierarchy. The administration console can use JAVA Server Page (JSPs). As shown in FIG. 3, the resources inheritance hierarchy include levels determined from tags of JSP pages used in the administration console. In one embodiment, other levels are portal based hierarchy levels. The resource inheritance hierarchy can be used to determine user privileges in a dynamic presentation of the system administration console. In this example, the administration console is written using a portal product such as the WebLogic Portal™ available from BEA Systems of San Jose, Calif. The portal can define a portal hierarchy such as the portal hierarchy of desktop, book, page, and portlet. The portal hierarchy can define a security system such as the security in the P13NSecurityResource class. In one embodiment, P13NSecurityResource class can be expanded to produce a ConsoleResource class described below.

More than one instance of a portlet can be active in a portal. In one embodiment, for each portlet instance, the JSP-derived hierarchy levels are determined.

Figure 4:
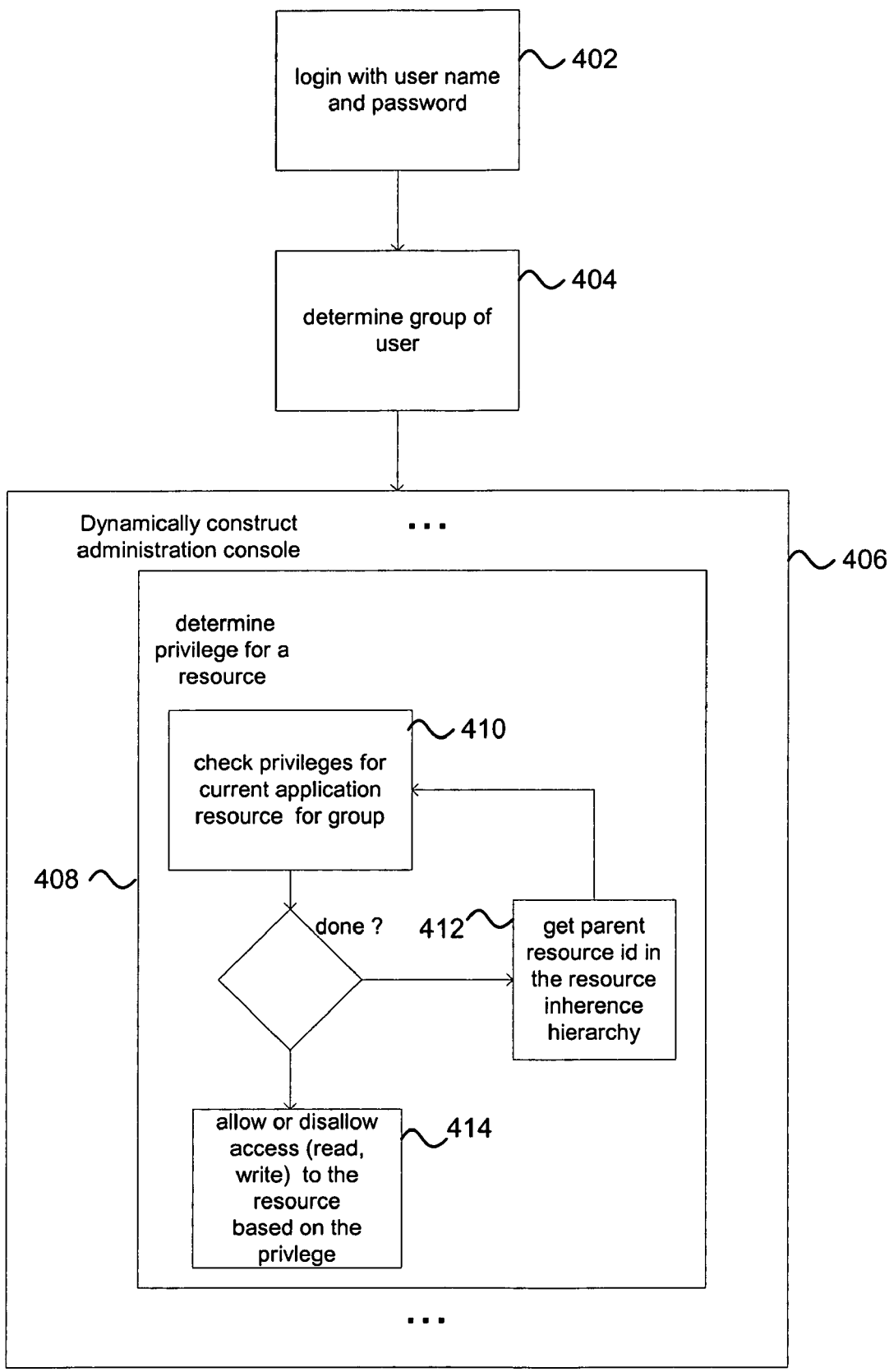
FIG. 4 is a diagram that illustrates the operation of one embodiment of the system administration console of the present invention.

FIG. 4 illustrates one embodiment of the system of the present invention. In step 402, the user logs-in with a name and password. In step 404, the administration group that the user is a member of is determined. If the user is not a member on any groups, the user is prevented from accessing the administration console. In step 406, the administration console is dynamically constructed. The dynamic construction of the administration console includes a step 408 of determining a privilege for resource. The resource can include portal type resources (books, pages, portlets) or JSP-derived resource (forms, buttons, fields, etc). In one embodiment, the privileges for a current application resource for a group is determined in step 410. The parent resource for the inheritance hierarchy is obtained in step 412 and the process is repeated until the top level is reached. Parts of the hierarchal check of the privileges can be done using a portal product, such as by using the P13NSecurityResource class in the WebLogic Portal™ product. One embodiment of the present invention expands the hierarchal inheritance check to include the JSP derived hierarchy levels such as those shown in FIG. 3. In step 414, access to read or write a resource is allowed or disallowed based upon the privilege. For example, someone without a privilege would not be able to write into a field to change an attribute for the administration of an application server. In one embodiment, the personalization is done through portal security and the personalization of the administration console piggybacks upon the portal security.

The JSPs of the administration console can comprise of a structure like

```
<jspPage>
    <form>
        <inputfields>
        <buttons>
    </form>
    <table>
        <colums>
    </table>
    <links/>
</jspPage>
```

This structure implies a hierarchy to the elements on a page, which can be used for a hierarchy for security or personalization related information. For example, if a user has the capability to "write" a form on the page, then they have the capability to "write" individual fields in that form, unless otherwise overridden.

The elements (resources) of a JSP can be identified automatically by virtue of some other property of the artifact. For example, form fields have a name property, which identifies them within a form. Similarly, forms also have a name. The pages, links and tables can be explicitly named.

Because JSPs are written with a hierarchy structure, this hierarchy structure can be used to provide security. An example of a JSP page is shown below.

```
<jspPage name="ejbDeployment">
    <form name="deploy">
        <field name="ejbname">
        <field name="location">
        <field name="state">
        <field name="deploymentorder">
        <button name="apply">
    </form>
</jspPage>
```

In this example there is a JSP page named "ejbDeployment" with 4 fields and one button.

In this example, each portlet instance will have an identifier. Each JSP page will also have a page label. In the example given above, the page label is "ejbDeployment". Based on the tags in the JSP page, other hierarchal levels of the hierarchal recourse inheritance hierarchy can be determined. Once these items are identified, the custom tags used in the console can take advantage of this resource scheme to render content appropriately.

Assume that a user wants to update an attribute with the field name "deploymentorder". In the dynamic creation of the application console, it is checked whether the group which the user is a member of is able to write the attribute for the field "deploymentorder". First it is checked at the level of the field "deploymentorder" then it is checked at the level of the form "deploy", then it is checked at the JSP level "EJP Deployment", then it is checked at the portlet instance level, then it is checked at the portlet, page, book and then desktop levels. If the permission to write is granted at any level of the hierarchy, then the user, which is a member of the group can write into the field. If this permission is not granted, the user is not able to update the attribute. In the creation of the administration console, it may be that there is no read privilege for a user. In that case, the deployment order field is not shown to the user. For example, the administration system console can check to see whether the user is able to read the field "deploymentorder" up through the resource inheritance hierarchy.

In order to determine authorization of artifiacts on the page, the WebLogic Portal's entitlement API can be used. Specifically the P13NSecurityResource class to describe these resources. The ConsoleResource object can have 3 attributes:

Portlet Instance—this is the name of the containing portlet instance for the page.

Application Resource ID—this is the part of the resource that describes application specific resources. In our case, this is the hierarchy of the page artifacts.

Capability—these are the capabilities that we will entitle users to the capability if functionally equivalent to a privilege the user is afforded on the resource. For example, "read" implies that a user has permission to read the attributes related to the application resource ID in question. These capabilities will be a finite well known set, such that we can query as to whether a user has permission to perform a set of actions on a given resource.

The application resource ID can be simple "." separated list of strings which describe the artifacts on a page. Level/name pairs can be used in the strings. Using the example above, we can model the filed name "location" with an application recourse ID of:

JspPage.ejbDeployment.form.deploy.field.location

These resources have a specific hierarchy, determined both by the part of the Application Resource ID and the capability. Using the example above, the resource with an application resource ID of:

JspPage.ejbDeployment.form.deploy.field.location and the user requesting trying to "read" the field, We would have a console resource like:

ConsoleResource—jspPage.ejbDeployment.form.deploy.field.location,capability=read With subsequent parents of:

| | |
|---|---|
| ConsoleResource | jspPage.ejbDeployment.form.deploy.field.location |
| ConsoleResource capability=read | jspPage.ejbDeployment.form.deploy.field, |
| ConsoleResource | jspPage.ejbDeployment.form.deploy.field |
| ConsoleResource capability=read | jspPage.ejbDeployment form.deploy, |
| ConsoleResource | jspPage.ejbDeployment.form.deploy |
| ... | |
| ConsoleResource | "All Console Resources" |
| PortletResource | portletInstanceName, capability=read |
| PortletResource | portletInstanceName |
| DesktopResource | desktopID |

Capabilities can persist as part of the inheritance hierarchy, such that subsequent calls to getparent( ) can maintain the notion of the capability afforded to the child resource. This means that a capability is inherited. For example, if a user has the "write" capability on "jspPage.ejbDeployment.formdeploy", then it would also have "write" capability for "jspPage.ejbDeployment.form.deploy.field.deploymentorder".
Application Resource ID element can be used in defining the hierarchy of the resources.

Every JSP page can have as its direct parent the portlet instance in which it resides. This is the reason for passing the portlet instance name to the ConsoleResource object. We can use the portlet instance name to generate the appropriate resource object to use as the parent of the ConsoleResource object. Because of this we can inherit policy from the fields all the way up to the portal desktop level.

In one embodiment, possible user privileges include "read" and "write". The "read" privileges allow the display an element in the application console. The "write" privileges allow the updating of an attribute for the administration server thought the administration console. In one embodiment, some features on the system administration console are displayed or not displayed based upon the user role. In one embodiment, the system administration console is used to manage a domain including application server resources. In one embodiment, the system console is a portal. In one embodiment, some levels of the resources hierarchy are defined by a portal hierarchy.

In one embodiment, a policy file is used to determine the privileges for a user. The policy file can be a policy XML file. In one embodiment the policy file indicates an application resource ID of which a privilege is granted. For example, the administration group may have all privileges granted at the desktop level which is inherited by every other level and the resource inheritance hierarchy. Other groups may have permissions to write to specific resources as defined by the resource ID which is a part of the resource inheritance hierarchy. In one embodiment, the policy XML is accessed by ConsoleResource objects to determine whether a specific resource can be read or written.

One embodiment of the present invention may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, RAMs, EPROM's, EEPROM's, DRAM's, flash memory devices, magnetic or optical cards, Nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A system administration console to manage application server resources, comprising:
 a resource inheritance hierarchy including some levels determined from a tag structure of a system administration console element, the resource inheritance hierarchy being used to determine user privileges in a dynamic presentation of the system administration console;
 wherein the system administration console is used to perform a plurality of management tasks and wherein the user privileges determine which management tasks a user is allowed perform using the system administration console;
 wherein the dynamic presentation of the system administration console includes dynamically constructing the system administration console to show forms and fields of the system administration console corresponding to the management tasks the user is allowed to perform based on the user privileges;
 wherein the dynamic presentation of the system administration console also includes checking the user privileges using the resource inheritance hierarchy and wherein the user privileges are determined at a tag level so that the user privileges can be granted or overridden at the tag level; and
 wherein checking the user privileges using the resource hierarchy includes determining if a group to which the user belongs has access to an attribute, then determining if the group has access to a parent of the attribute, then repeating until the group's access at each level of the resource inheritance hierarchy has been determined.

2. The system administration console of claim 1, wherein possible user privileges include read and write.

3. The system administration console of claim 1, wherein some features of the system administration console are displayed or not displayed based on a user role.

4. The system administration console of claim 1, wherein the system administration console is used to manage a domain including the application server resources.

5. The system administration console of claim 1, wherein the system administration console is a portal.

6. The system administration console of claim 5, wherein additional levels of resource inheritance hierarchy are defined by a portal hierarchy.

7. The system administration console of claim 1, wherein a policy file is used to determine the privileges for a user.

8. The system administration console of claim 1, wherein the element is a java server page.

9. The system administration console of claim 8, wherein some levels of the resource inheritance hierarchy are determined from tags of the java server page.

10. A method comprising:
   determining user privileges of a user of a system administration console for managing application server resources, the determination using a resource inheritance hierarchy of the system administration console, the resource inheritance hierarchy including some levels determined from a tag structure of a system administration console element;
   wherein the system administration console is used to perform a plurality of management tasks and wherein the user privileges determine which management tasks the user is allowed perform using the system administration console;
   dynamically presenting the system administration console to the user using the determined the user privileges;
   wherein the dynamic presentation of the system administration console includes dynamically constructing the system administration console to show forms and fields of the system administration console corresponding to the management tasks the user is allowed to perform based on the user privileges;
   wherein the dynamic presentation of the system administration console also includes checking the user privileges using the resource inheritance hierarchy and wherein the user privileges are determined at a tag level so that the user privileges can be granted or overridden at the tag level; and
   wherein checking the user privileges using the resource hierarchy includes determining if a group to which the user belongs has access to an attribute, then determining if the group has access to a parent of the attribute, then repeating until the group's access at each level of the resource inheritance hierarchy has been determined.

11. The method of claim 10, wherein possible user privileges include read and write.

12. The method of claim 10, wherein some features of the system administration console are displayed or not displayed based on a user role.

13. The method of claim 10, wherein the system administration console is used to manage a domain including the application server resources.

14. The method of claim 10, wherein the system administration console is a portal.

15. The method of claim 14, wherein additional levels of resource inheritance hierarchy are defined by a portal hierarchy.

16. The method of claim 10, wherein a policy file is used to determine the privileges for a user.

17. The method of claim 10, wherein the element is a java server page.

18. The method of claim 17, wherein some levels of the resource inheritance hierarchy are determined from tags of the java server page.

19. A computer readable storage medium including code to do the steps of:
   determining user privileges of a user of a system administration console for managing application server resources, the determination using a resource inheritance hierarchy of the system administration console, the resource inheritance hierarchy including some levels determined from a tag structure of a system administration console element;
   wherein the system administration console is used to perform a plurality of management tasks and wherein the user privileges determine which management tasks the user is allowed perform using the system administration console;
   dynamically presenting the system administration console to the user using the determined the user privileges;
   wherein the dynamic presentation of the system administration console includes dynamically constructing the system administration console to show forms and fields of the system administration console corresponding to the management tasks the user is allowed to perform based on the user privileges;
   wherein the dynamic presentation of the system administration console also includes checking the user privileges using the resource inheritance hierarchy and wherein the user privileges are determined at a tag level so that the user privileges can be granted or overridden at the tag level; and
   wherein checking the user privileges using the resource hierarchy includes determining if a group to which the user belongs has access to an attribute, then determining if the group has access to a parent of the attribute, then repeating until the group's access at each level of the resource inheritance hierarchy has been determined.

20. The computer readable medium of claim 19, wherein the element is a java server page.

* * * * *

UNITED STATES PATENT AND TRADEMARK OFFICE
CERTIFICATE OF CORRECTION

PATENT NO. : 7,424,531 B2  Page 1 of 1
APPLICATION NO. : 11/111624
DATED : September 9, 2008
INVENTOR(S) : Chiodo et al.

It is certified that error appears in the above-identified patent and that said Letters Patent is hereby corrected as shown below:

In column 5, line 18, delete "getparent( )" and insert -- getParent( ) --, therefor.

Signed and Sealed this

Sixteenth Day of March, 2010

David J. Kappos
*Director of the United States Patent and Trademark Office*